United States Patent
Boughton et al.

(10) Patent No.: US 11,753,327 B2
(45) Date of Patent: Sep. 12, 2023

(54) RF PLASMA OPTICAL FIBER ANNEALING APPARATUSES, SYSTEMS, AND METHODS OF USING THE SAME

(71) Applicant: CORNING INCORPORATED, Corning, NY (US)

(72) Inventors: Daniel Robert Boughton, Naples, NY (US); Kenneth Edward Hrdina, Horseheads, NY (US); Stefan Wolfgang Kramel, Ithaca, NY (US); Christopher Scott Thomas, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 94 days.

(21) Appl. No.: 16/903,781

(22) Filed: Jun. 17, 2020

(65) Prior Publication Data
US 2020/0399163 A1 Dec. 24, 2020

Related U.S. Application Data

(60) Provisional application No. 62/865,612, filed on Jun. 24, 2019.

(51) Int. Cl.
*C03B 37/10* (2006.01)
*C03B 37/029* (2006.01)

(52) U.S. Cl.
CPC ............ *C03B 37/10* (2013.01); *C03B 37/029* (2013.01)

(58) Field of Classification Search
None
See application file for complete search history.

(56) References Cited

U.S. PATENT DOCUMENTS

| | | | |
|---|---|---|---|
| 4,440,556 A * | 4/1984 | Oh | C03B 37/029 65/436 |
| 4,874,415 A | 10/1989 | Boniort et al. | |
| 6,130,397 A | 10/2000 | Arai | |
| 9,533,909 B2 | 1/2017 | Boughton | |
| 9,908,804 B2 | 3/2018 | Boughton | |
| 2006/0191293 A1 | 8/2006 | Kuczma | |
| 2011/0289980 A1* | 12/2011 | Filippov | C03B 37/032 65/435 |

(Continued)

FOREIGN PATENT DOCUMENTS

| | | |
|---|---|---|
| CN | 102079623 A | 6/2011 |
| EP | 0097348 A1 | 1/1984 |

(Continued)

OTHER PUBLICATIONS

Behera, R., Pandey, A., Lanke, M., "Design of Annealing Furnace to Lower the Attenuation in Optical Fiber," www.sterlitetechnologies.com (Apr. 2014).

(Continued)

*Primary Examiner* — Lisa L Herring
(74) *Attorney, Agent, or Firm* — Kevin L. Bray (57) ABSTRACT

Methods, apparatuses and systems of manufacturing an optical fiber are disclosed herein. The methods may include heating an optical preform in a draw furnace, drawing an optical fiber from the optical preform, cooling the optical fiber with a slow cooling device, and annealing the optical fiber by passing the optical fiber through an RF plasma heating apparatus.

13 Claims, 7 Drawing Sheets

(56) References Cited

U.S. PATENT DOCUMENTS

| | | | |
|---|---|---|---|
| 2013/0224396 | A1 | 8/2013 | Furusho |
| 2013/0255323 | A1* | 10/2013 | Matsushita ....... C03B 37/02718 65/435 |
| 2014/0268535 | A1* | 9/2014 | Hamburgen .......... G06F 1/1656 361/679.31 |
| 2015/0040614 | A1* | 2/2015 | Dunwoody .......... C03B 37/032 65/384 |
| 2015/0274569 | A1* | 10/2015 | Boughton ................ H05H 1/46 65/142 |
| 2016/0280608 | A1* | 9/2016 | Foret ....................... H05H 1/42 |
| 2017/0073265 | A1* | 3/2017 | Bookbinder .......... C03B 37/029 |
| 2019/0092678 | A1 | 3/2019 | Bookbinder et al. |

FOREIGN PATENT DOCUMENTS

| | | |
|---|---|---|
| JP | 02-074542 A | 3/1990 |
| JP | 2011-117020 A | 6/2011 |

OTHER PUBLICATIONS

E. Pfender and Y.C. Lee, "Heat Transfer Analysis of the Plasma Sintering Process," Mat. Res. Soc. Sym. Proc., 30, 141-150 (1984).

E. Pfender, "Heat and Momentum Transfer to Particles in Thermal Plasma Flow," Pure and Applied Chemistry., 57 [9] 1179-1195 (1985).

Healy, N., Mailis, S., Day, T.D., Sazio, P.J.A., Badding, J.V., Peacock, A.C., "Laser Annealing of Amorphous Silicon Core Optical Fibers," Advanced Photonics Congress, (2012) OSA Publications.

Hrdina, Kenneth, Johnson, D. Lynn, "Chemical and Thermal Effects of Rapid Sintered Alumina in an RF Induction-coupled Plasma," Solid State Ionics, vol. 26, Iss. 2, Feb.-Mar. 1988, p. 160.

International Search Report and Written Opinion of the International Searching Authority; PCT/US2020/036766; dated Sep. 3, 2020; 11 Pages; European Patent Office.

Peng, Y., Agarwal, A., Tomozawa, M., Blanchet, T.A., "Radial Distribution of Fictive Temperatures in Silica Optical Fibers," Journal of Non-Crystalline Solids 217 (1997) pp. 272-277.

Reed, Thomas B. Reed, "Induction-Coupled Plasma Torch," Journal of Applied Physics, 32, 5, (1961), pp. 821-824.

Tran, Harada, Sasaki and Kikuchi, "Effect of Dielectric in a Plasma Annealing System at Atmospheric Pressure," Intech, Chapters, (2012), 181-198.

Tsubasa Nakamura, Chainarong Buttapeng, Seizo Furuya, and Nobuhiro Harada, "Annealing of Metal Wire by Atmospheric Pressure Discharge Plasma," 2nd IEEE International Conference on Power and Energy (PECon 08), Dec. 1-3, 2008, Johor Baharu, Malaysia 1498-1503.

* cited by examiner

RF PLASMA OPTICAL FIBER ANNEALING APPARATUSES, SYSTEMS, AND METHODS OF USING THE SAME

This application claims priority under 35 USC § 119(e) from U.S. Provisional Patent Application Ser. No. 62/865,612, filed on Jun. 24, 2019, and which is incorporated by reference herein in its entirety.

TECHNICAL FIELD

The present disclosure generally relates to systems and methods for manufacturing an optical fiber utilizing RF plasma heating apparatuses.

BACKGROUND

The processes and parameters of heating and cooling an optical fiber as it is drawn are directly related to attenuation characteristics of the optical fiber. Excessive attenuation in a drawn optical fiber results in poor optical fiber performance. Therefore, it is desirable to implement annealing processes and apparatuses for improving or reducing optical attenuation of the drawn optical fiber. Current processes utilize a fiber draw annealing furnace attached to the hot zone of the fiber draw. Some of these systems may also include a secondary furnace, which is intended to reduce the cooling rate of the optical fiber to improve the optical fiber characteristics. Another process utilizes lasers to heat the optical fiber on the draw to reheat the optical fiber to its annealing temperature after cooling. However, aligning and focusing a laser beam is technically challenging. Another reheating method utilizes a gas oxygen/hydrogen torch. However, these methods are limited by low reheating rates, which in turn limits the speed at which an optical fiber may be drawn from an optical preform.

Accordingly, a need exists for systems, methods, and apparatuses for reheating optical fiber with uniform heat at a high heating rate for improving or reducing optical attenuation of the drawn optical fiber.

SUMMARY

In a first aspect A1, a method of manufacturing an optical fiber includes heating an optical preform in a draw furnace, drawing an optical fiber from the optical preform, and annealing the optical fiber by passing the optical fiber through an RF plasma heating apparatus.

A second aspect A2 includes the method of manufacturing an optical fiber of the first aspect A1 where the RF plasma heating apparatus operates at a frequency of 1 MHz to 100 MHz.

A third aspect A3 includes the method of manufacturing an optical fiber of any one of the first-second aspects A1-A2, where the RF plasma heating apparatus operates at a power level of 1 kW to 100 kW.

A fourth aspect A4 includes the method of manufacturing an optical fiber of any one of the first-third aspects A1-A3, where the RF plasma heating apparatus heats the optical fiber at a heating rate of 5,000° C. per second (° C./s) or greater.

A fifth aspect A5 includes the method of manufacturing an optical fiber of any one of the first-fourth aspects A1-A4, where the optical fiber is drawn at a draw speed of 30 m/s or greater.

A sixth aspect A6 includes the method of manufacturing an optical fiber of any one of the first-fifth aspects A1-A5, where the RF plasma heating apparatus operates at a frequency of 13.56 MHz with a power level up to 5 kW.

A seventh aspect A7 includes the method of manufacturing an optical fiber of any one of the first-sixth aspects A1-A6 further includes cooling the optical fiber with a slow cooling device, passing the optical fiber through one or more coating and curing processes, inspecting the optical fiber for flaws, and spooling the optical fiber on a spool.

In an eighth aspect A8, a system for manufacturing an optical fiber includes a draw furnace configured to heat an optical preform and an RF plasma heating apparatus, where the RF plasma heating apparatus is configured to anneal the optical fiber drawn from the optical preform as the optical fiber passes through the RF plasma heating apparatus.

A ninth aspect A9 includes the system of manufacturing an optical fiber of eighth aspect A8, and further includes one or more slow cooling devices positioned to receive an optical fiber drawn from the optical preform.

A tenth aspect A10 includes the system of manufacturing an optical fiber of ninth aspect A9, where the RF plasma heating apparatus operates at a frequency of 1 MHz to 100 MHz.

An eleventh aspect A11 includes the system of manufacturing an optical fiber of any one of the eighth-tenth aspect A8-A10, where the RF plasma heating apparatus operates at a power level of 1 kW to 100 kW.

A twelfth aspect A12 includes the system of manufacturing an optical fiber of any one of the eighth-eleventh aspect A8-A11, where the RF plasma heating apparatus heats the optical fiber at a heating rate of 5,000° C. per second (° C./s) or greater.

A thirteenth aspect A13 includes the system of manufacturing an optical fiber of any one of the eighth-twelfth aspect A8-A12, where the optical fiber is drawn at a draw speed of 30 m/s or greater.

A fourteenth aspect A14 includes the system of manufacturing an optical fiber of any one of the eighth-thirteenth aspect A8-A13, where the RF plasma heating apparatus operates at a frequency of 13.56 MHz with a power level up to 5 kW.

A fifteenth aspect A15 includes the system of manufacturing an optical fiber of any one of the eighth-fourteenth aspect A8-A14, further includes one or more coating devices for applying one or more coatings to the optical fiber, one or more curing devices for curing the one or more coatings applied to the optical fiber, and a fiber take-up mechanism comprising one or more fiber tensioning mechanisms and a fiber storage spool.

In a sixteenth aspect A16, an RF plasma heating apparatus for use in manufacturing an optical fiber includes an inductor coiled positioned around a portion of a plasma containment tube, where the plasma containment tube includes a first opening and a second opening opposite the first opening permitting an optical fiber to pass through the plasma containment tube; a gas source fluidly coupled to the plasma containment tube, where one or more gases for generating plasma flow through the plasma containment tube; and an RF generator electrically coupled to the inductor by way of one or more tuning matching networks, where, when activated, the RF generator produces an RF current at a frequency within the inductor such that the inductor produces plasma within the plasma containment tube.

A seventeenth aspect A17 includes the RF plasma heating apparatus of the sixteenth aspect A16, further comprising an electronic control unit communicatively coupled to the one or more tuning matching networks, where the electronic control unit is configured to tune the one or more tuning matching networks such that a phase angle between a voltage and the RF current is set near to or at zero.

An eighteenth aspect A18 includes the RF plasma heating apparatus of any one of the sixteenth-seventeenth aspect A16-A17, further including an outer tube positioned concentric with the plasma containment tube, where a passage between the outer tube and the plasma containment tube permits a coolant to flow therebetween.

A nineteenth aspect A19 includes the RF plasma heating apparatus of any one of the sixteenth-eighteenth aspect A16-A18, further comprising a heat exchanger unit fluidly coupled to the passage, where the heat exchanger unit provides the coolant to the passage, the coolant having a resistivity of or greater than 2 megaOhm-centimeter.

A twentieth aspect A20 includes the RF plasma heating apparatus of any one of the sixteenth-nineteenth aspect A16-A19, where at least one gas of the one or more gases for generating plasma is Argon.

A twenty-first aspect A21 includes the RF plasma heating apparatus of any one of the sixteenth-twentieth aspect A16-A20, where the frequency is 13.56 MHz.

In a twenty-second aspect A22, a method of processing an optical fiber includes conveying an optical fiber at a speed greater than 30 m/s, the conveying comprising heating the optical fiber from a first temperature to a second temperature, the heating comprising exposing the optical fiber to a plasma.

A twenty-third aspect A23 includes the method of processing the optical fiber of the twenty-second aspect A22, where the optical fiber is conveyed at a speed greater than 40 m/s.

A twenty-fourth aspect A24 includes the method of processing the optical fiber of the twenty-second aspect A22, where the optical fiber is conveyed at a speed greater than 50 m/s.

A twenty-fifth aspect A25 includes the method of processing the optical fiber of the twenty-second aspect A22, where the optical fiber is conveyed at a speed greater than 60 m/s.

A twenty-sixth aspect A26 includes the method of processing the optical fiber of any one of the twenty-second to twenty-fifth aspect A22-A25, where the optical fiber has a diameter less than 200 microns.

A twenty-seventh aspect A27 includes the method of processing the optical fiber of any one of the twenty-second to twenty-fifth aspect A22-A25, where the optical fiber has a diameter between 70 microns and 150 microns.

A twenty-eighth aspect A28 includes the method of processing the optical fiber of any one of the twenty-second to twenty-seventh aspect A22-A27, where the first temperature is less than 800° C. and the second temperature is greater than 800° C.

A twenty-ninth aspect A29 includes the method of processing the optical fiber of any one of the twenty-second to twenty-seventh aspect A22-A27, where the first temperature is less than 1000° C. and the second temperature is greater than 1,000° C.

A thirtieth aspect A30 includes the method of processing the optical fiber of any one of the twenty-second to twenty-seventh aspect A22-A27, where the first temperature is between 100° C. and 1,000° C. and the second temperature is between 800° C. and 1,400° C.

A thirty-first aspect A31 includes the method of processing the optical fiber of any one of the twenty-second to twenty-seventh aspect A22-A27, where the first temperature is between 400° C. and 900° C. and the second temperature is between 900° C. and 1,200° C.

A thirty-second aspect A32 includes the method of processing the optical fiber of any one of the twenty-second to thirty-first aspect A22-A31, where the heating occurs at a rate of or exceeding 5,000° C./s.

A thirty-third aspect A33 includes the method of processing the optical fiber of any one of the twenty-second to thirty-first aspect A22-A31, where the heating occurs at a rate of or exceeding 10,000° C./s.

A thirty-fourth aspect A34 includes the method of processing the optical fiber of any one of the twenty-second to thirty-first aspect A22-A31, where the heating occurs at a rate of or exceeding 20,000° C./s.

A thirty-fifth aspect A35 includes the method of processing the optical fiber of any one of the twenty-second to thirty-fourth aspect A22-A34, where the plasma is an RF plasma.

A thirty-sixth aspect A36 includes the method of processing the optical fiber of any one of the twenty-second to thirty-fifth aspect A22-A35, where the plasma surrounds the optical fiber.

A thirty-seventh aspect A37 includes the method of processing the optical fiber of any one of the twenty-second to thirty-sixth aspect A22-A36, where the conveying comprises directing the optical fiber along a process pathway and where the heating from the first temperature to the second temperature occurs over a distance of less than 100 cm along the process pathway.

A thirty-eighth aspect A38 includes the method of processing the optical fiber of the thirty-seventh aspect A37, where the heating from the first temperature to the second temperature occurs over a distance of less than 50 cm along the process pathway.

A thirty-ninth aspect A39 includes the method of processing the optical fiber of the thirty-seventh aspect A37, where the heating from the first temperature to the second temperature occurs over a distance of less than 10 cm along the process pathway.

A fortieth aspect A40 includes the method of processing the optical fiber of any one of the thirty-seventh to thirty-ninth aspect A37-A39, where the second temperature is at least 100° C. greater than the first temperature.

A forty-first aspect A41 includes the method of processing the optical fiber of any one of the thirty-seventh to thirty-ninth aspect A37-A39, where the second temperature is at least 300° C. greater than the first temperature.

A forty-second aspect A42 includes the method of processing the optical fiber of any one of the thirty-seventh to thirty-ninth aspect A37-A39, where the second temperature is at least 500° C. greater than the first temperature.

A forty-third aspect A43 includes the method of processing the optical fiber of any one of the twenty-second to forty-second aspect A22-A42, where the conveying further comprises drawing the optical fiber from an optical preform and cooling the optical fiber to the first temperature.

A forty-fourth aspect A44 includes the method of processing the optical fiber of the forty-third aspect A43, where the cooling to the first temperature comprises cooling the optical fiber at a rate less than 2,000° C./s.

A forty-fifth aspect A45 includes the method of processing the optical fiber of any one of the twenty-second to forty-fourth aspect A22-A44, that further includes cooling the optical fiber from the second temperature to a third temperature at a rate less than 2,000° C./s.

BRIEF DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

DETAILED DESCRIPTION

The present disclosure relates to systems and methods for manufacturing optical fiber utilizing an RF plasma heating apparatus. Embodiments described herein disclose techniques that improve or reduce optical attenuation in optical fibers drawn at relatively high fiber draw speeds. In some embodiments, the RF plasma heating apparatus generates an atmospheric pressure thermal plasma for annealing (e.g., reheating an optical fiber to a temperature sufficient to anneal the optical fiber, thereby improving fiber optic characteristics). In conventional optical fiber manufacturing processes, annealing is accomplished by maintaining an optical fiber at a temperature sufficient to anneal the optical fiber in a slow cooling device. The slow cooling device is a controlled cooling device configured to reduce the cooling rate of the optical fiber to a rate less than the rate of cooling of the optical fiber in air. The reduced cooling rate lowers the attenuation of the optical fiber by increasing the time at which the optical fiber is at a temperature sufficient to anneal the optical fiber. To improve manufacturing efficiency, it is desirable to increase the draw speed of the optical fiber. Faster draw speeds, however, lead to shorter residence times of the optical fiber in a slow cooling device. Shorter residence times reduce the annealing time of the optical fiber and lead to increased levels of attenuation in optical fibers.

The embodiments of the present disclosure are designed to increase the annealing time of optical fiber in a continuous manufacturing process. As optical fiber progresses in a manufacturing process, its temperature decreases from a melt temperature (upon initiation of fiber formation from an optical preform in a draw furnace) to room temperature (at take up on a storage spool at the end of the process). The embodiments of the present disclosure increase annealing time through reheating of the optical fiber when its temperature decreases to a temperature insufficient to anneal the optical fiber. The reheating increases the temperature of the optical fiber to a temperature sufficient to anneal the optical fiber to extend the annealing process, thereby resulting in an optical fiber with lower attenuation. The embodiments of the present disclosure are effective at high draw speeds because they enable rapid reheating of the optical fiber. Reheating of the optical fiber at rates of or exceeding 5,000° C./s after the optical fiber cools to a temperature insufficient to anneal is achievable in a continuous optical fiber draw process. The reheating disclosed herein is implemented independently or in conjunction with conventional slow cooling devices.

Rapid reheating of the optical fiber may be achieved at fiber draw speeds greater than 30 m/s or even greater than about 50 m/s. Furthermore, the optical fiber, before reheating, may have a temperature between RT (room temperature, e.g., about 25° C.) and about 400° C., a temperature between 400° C. to 800° C., or a temperature of between about 800° C. to 1,400° C. In some embodiments, the optical fiber may be heated from a first temperature to a second temperature by way of a plasma. For example, the first temperature is less than 800° C. and the second temperature is greater than 800° C. In some embodiments, the first temperature is less than 1,000° C. and the second temperature is greater than 1,000° C., or the first temperature is between 100° C. and 1,000° C. and the second temperature is between 800° C. and 1,400° C., or the first temperature is between 400° C. and 900° C. and the second temperature is between 900° C. and 1,200° C. or any values therebetween. In some embodiments, the second temperature is at least 100° C. greater than the first temperature, is at least 300° C. greater than the first temperature, or is at least 500° C. greater than the first temperature. The reheated temperature of the optical fiber may be between about 1,250° C. and 1,450° C., between 800° C. and 1,400° C., between 1,200° C. and 1,300° C., between 800° C. and 1,100° C. depending on the type of fiber to reduce fictive temperature (Tf) to reduce Rayleigh scattering and/or to anneal the optical fiber.

Moreover, reheating of the optical fiber through the systems, methods, and utilization of the apparatuses described herein may be achieved over a 3 cm to a 100 cm draw distance, of a distance of less than 100 cm, or a distance of less than 50 cm, or a distance of less than 10 cm, any value between 3 cm and 100 cm. Embodiments described herein utilize thermal atmospheric pressure plasma (e.g., Inductively Coupled Plasma (ICP)) to reheat or anneal the drawn optical fiber.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Annealing is used herein to describe a thermal treatment applied to an optical fiber that is effective to reduce the attenuation of the optical fiber. The thermal treatment includes heating the optical fiber for a sufficient period of time to effect a structural change and/or anneal out defects in the optical fiber that leads to a reduction in attenuation of the optical fiber. A temperature or range of temperatures at which annealing occurs is referred to herein as an annealing temperature. The parameters of the process and RF plasma heating apparatus, which are implemented to reduce attenuation, may differ from fiber to fiber or differ based on the thermal history of the optical fiber and the type of optical fiber. As one example of a structural change effected by annealing, the optical fiber could be reheated to lower the fictive temperature, Tf of the glass, which reduces Rayleigh scattering and decreases the attenuation of the optical fiber. In another example annealing may reduce defects in the glass such as dangling bonds, Non-Bridging Oxygen Hole Centers (NBOHC's), Oxygen deficient centers (ODC's) or Germanium Oxygen Deficient Centers (GeODC's) as examples. Reducing these defects may lower the attenuation of the optical fiber. In another example, annealing may reduce multiple sources of attenuation in the optical fiber. In embodiments, plasma heating provides multiple heat transfer mechanisms including thermal conduction, radiation absorption and particle recombination on surfaces of the optical fiber. Each of these heat transfer mechanisms may contribute to reducing the attenuation of the optical fiber.

Moreover, plasma heating provides for substantially uniform tangential heating of the optical fiber and avoids the use of undesirable gases that may inadvertently damage the optical fiber. For example, the combustion of natural gas or methane could be used to heat the optical fiber quickly, perhaps not as fast as the plasma disclosed herein, but the use of natural gas or methane may result in hydrogen generation that diffuses into and reacts with the optical fiber creating undesirable adsorption bands that adversely impact the optical characteristics of the optical fiber. Furthermore, lasers may be used but are difficult to align and focus the laser beam and maintain uniform tangential heating.

Plasma as defined herein comprises a mixture of neutral atoms, energized but neutral atoms, ions, and free electrons created from a gas. The gas may be air, nitrogen, oxygen, a noble gas such as argon (Ar) or helium (He), and/or various combinations thereof. Plasmas are formed and sustained by a collisional ionization process in which mobile electrons with kinetic energy collide with neutral atoms and eject the outermost bound electrons of the neutral atoms from their orbitals leaving the atom electrically unbalanced (i.e., the atom is a positive ion). Atmospheric pressure plasma is defined as a plasma with a gas pressure at greater than about 90,000 Pa, or greater than about 91,000 Pa, or greater than about 92,000 Pa, or greater than about 93,000 Pa, or greater than about 94,000 Pa, or greater than about 95,000 Pa, or greater than about 96,000 Pa, or greater than about 97,000 Pa, or greater than about 98,000 Pa, or greater than about 99,000 Pa, or greater than about 100,000 Pa, or greater than about 101,000 Pa, and less than about 102,000 Pa. RF plasmas are defined as plasmas produced by RF currents with a frequency greater than 0.5 MHz and less than 100 MHz or plasmas induced by microwaves (e.g., electromagnetic waves of 300 MHz to 300 GHz.).

The plasma in some embodiments described herein is an atmospheric pressure inductively coupled RF thermal plasma. However, in some embodiments, the plasma containment tube may be pressurized with a gas to a pressure of about 13 Pa to 119,990 Pa and an inductively coupled RF thermal plasma may be generated therein by the systems described herein. In low-pressure applications, differential pressure chambers may be needed and/or the environment where the optical fiber is manufactured may be to be pressurized.

While inductively coupled plasmas are described herein, other types of plasmas can be used such as capacitively coupled plasmas or microwave induced plasmas. An inductively coupled plasma is defined as a plasma produced by way of an electrical coil such as a solenoid or pancake-shaped type of inductor. Inductively coupled plasmas heat the electrons and ions via a magnetic field which traps the charged particles, forcing them to spiral about the magnetic field lines, thereby increasing the frequency of collisions and producing more ions, making these types of plasma sources generally more thermal (i.e., having greater electron temperatures). In contrast, capacitively coupled plasmas are defined as a plasma produced by means of parallel plate structures separated by the plasma working gas as a spatial dielectric similar in construction to an electrical circuit capacitor. Capacitively coupled plasmas typically heat the ions and electrons via an electric field alternatively attracting and repelling the ions and electrons from the charges on the parallel plate. Capacitively coupled plasmas have lower ionization rates and the ions and electrons have lower kinetic energy making these types of plasma sources generally non-thermal (i.e., having lower electron temperatures).

Embodiments of systems, methods, and apparatuses for reheating an optical fiber via the use of Radio Frequency (RF) Inductively Coupled Plasma (ICP) operating at atmospheric pressure or under a vacuum at relatively high draw speeds will now be described in more detail herein.

Figure 1:
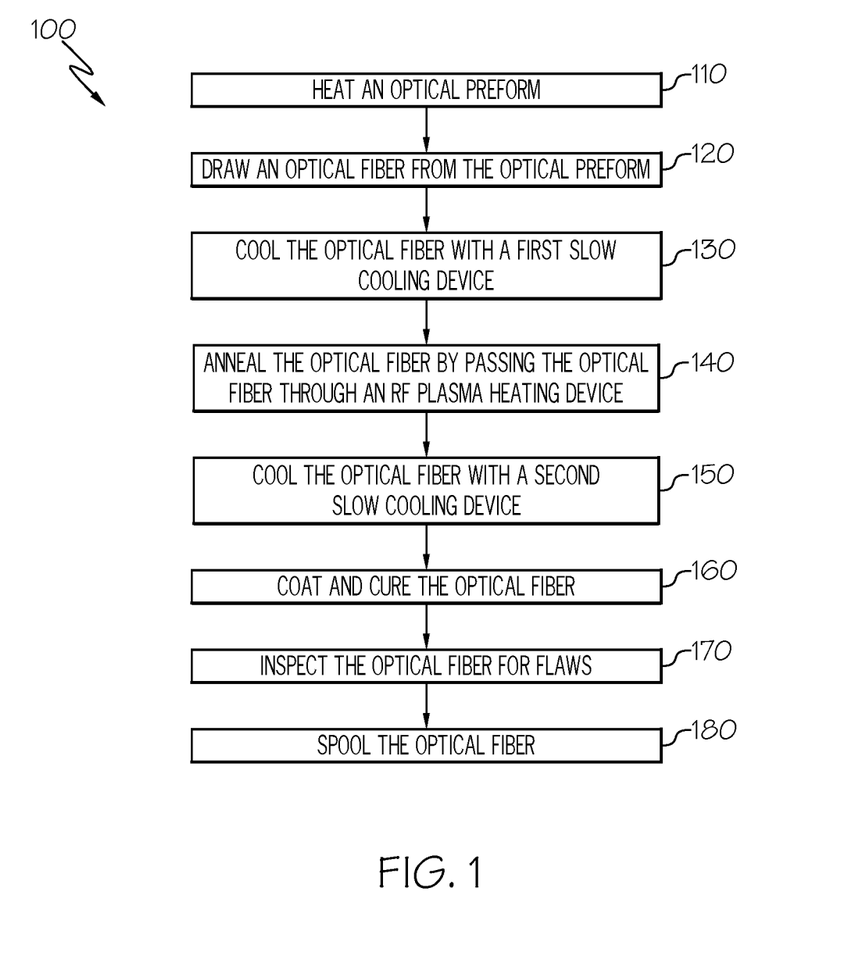
FIG. 1 is a flow diagram of a method of manufacturing an optical fiber according to one or more embodiments shown and described herein.

Referring to FIG. 1, a flow diagram of a method of manufacturing an optical fiber is shown. Manufacturing an optical fiber generally includes heating an optical preform in a draw furnace at block 110. The optical preform may comprise glass, such as silica ($SiO_2$) based glass, or any material suitable for the manufacture of optical fiber. Once the optical preform is heated, at block 120, an optical fiber may be drawn from the optical preform. Drawing the optical fiber can include pulling and conveying a heated portion from the optical preform along a predetermined path that leads through one or more stages of heating, cooling, curing, coating, and/or the like. In some embodiments, at block 130, an optical fiber is cooled by passing it through a first slow cooling device. A slow cooling device may include a wire wound furnace for providing a regulated level of heat to the optical fiber so that it does not cool too rapidly after the optical fiber exits the draw furnace. A slow cooling device is a device configured to cool the optical fiber at a rate less than the rate that the optical fiber would cool in air at room temperature in the absence of the slow cooling device. The slow cooling device provides a thermal environment with a temperature less than the surface temperature of the optical fiber and greater than room temperature. Cooling the optical fiber with the first slow cooling device at block 130 is optional.

At block 140, the optical fiber may be annealed by passing it through an RF plasma heating apparatus, which will be described in more detail herein. In general, the RF plasma heating apparatus is utilized to rapidly heat an optical fiber to a temperature required for improving attenuation and/or healing defects of the optical fiber (e.g., reducing the fictive temperature (Tf) of the optical fiber or reducing Rayleigh scattering in the optical fiber). In some embodiments, the optical fiber, at block 150, is optionally cooled using a second slow cooling device depending on the heating and cooling profile design for forming the optical fiber with relatively low attenuation and relatively few defects.

Once an optical fiber is formed, the optical fiber may be coated and the coatings cured through one or more processes, at block 160. The coating and curing processes may include applying protective layers on the optical fiber, colored coatings for visual indication of the type of optical fiber, or the like. At block 170, an optical fiber may be inspected for flaws. Although the illustrated flow diagram includes only one inspection step, it is understood that the optical fiber may be inspected any number of times during the drawing process. At block 180, the optical fiber is spooled using a fiber take-up mechanism having a plurality of fiber tensioning mechanisms and a fiber storage spool. The fiber take-up mechanism may be used to apply and maintain tension on the optical fiber during the draw from an optical preform to drive conveyance of the optical fiber along the process path.

It is understood that methods of manufacturing the optical fiber may include variations not illustrated or described with reference to FIG. 1. However, FIG. 1 provides an illustrative example, which will now be further explained through the description of the systems and apparatuses disclosed herein for manufacturing an optical fiber utilizing an RF plasma heating apparatus.

Figure 2:
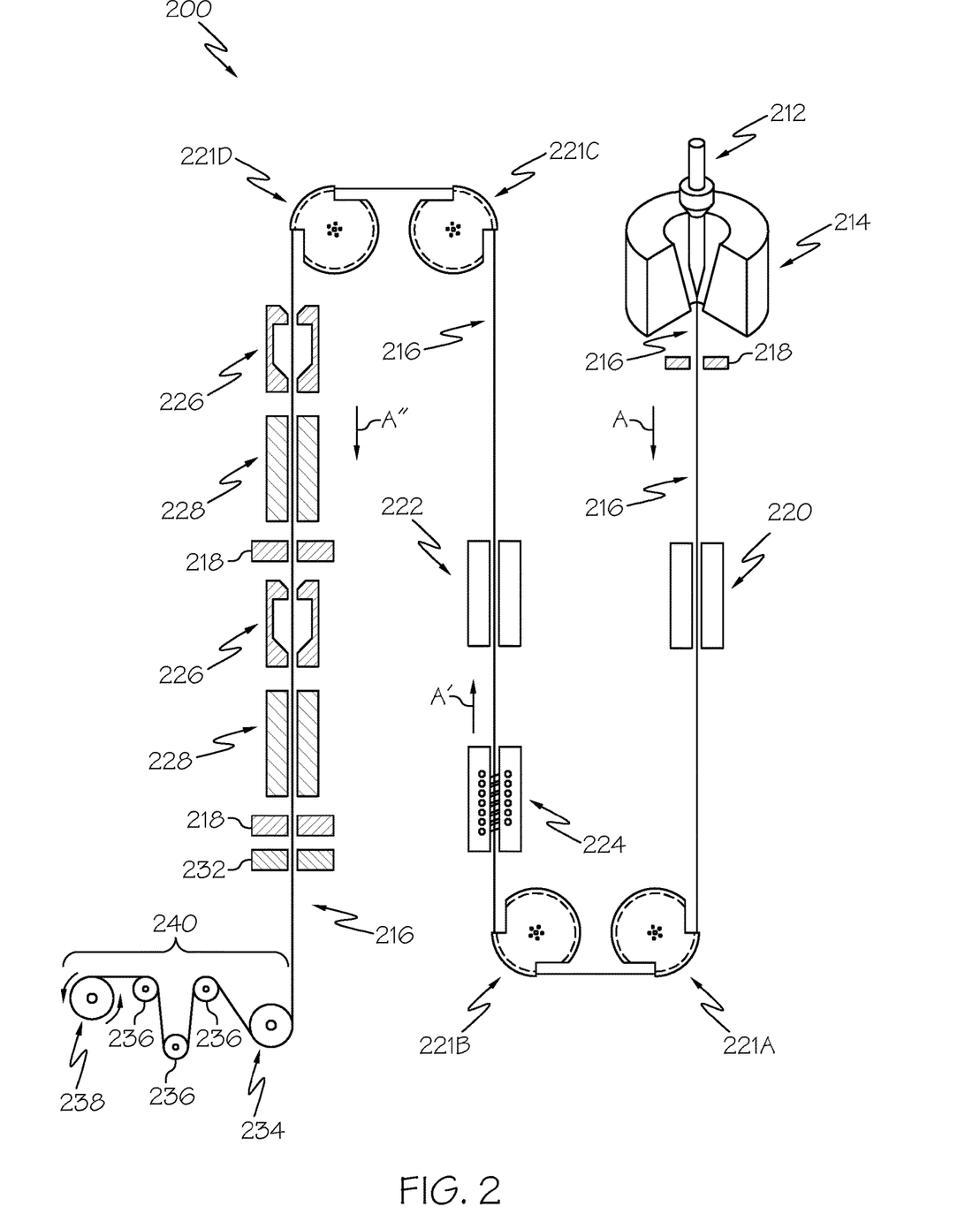
FIG. 2 is a schematic illustration of an optical fiber production system according to one or more embodiments shown and described herein.

Turning to FIG. 2, a schematic illustration of an optical fiber production system 200 is shown. Specifically, one embodiment of the system 200 for drawing the optical fiber 216 is illustrated which incorporates an RF plasma heating apparatus 224 that may be used to rapidly heat an optical fiber 216 while the optical fiber 216 is drawn at relatively high draw speeds as described herein. Draw speed refers to the speed of conveyance of the optical fiber along a process pathway. Draw speeds may include speeds from 2.5 m/s to 120 m/s, for example, 2.5 m/s, 5 m/s, 10 m/s, 20 m/s, 30 m/s, 40 m/s, 50 m/s, 60 m/s, 70 m/s, 80 m/s, 90 m/s, 100 m/s, 110 m/s, 120 m/s, or any value or range therebetween. The system 200 may comprise a draw furnace 214 for heating an optical preform 212 such that an optical fiber 216 may be drawn from the optical preform 212. The optical preform 212 may comprise glass, such as silica ($SiO_2$) based glass, or any material suitable for the manufacture of an optical fiber 216. Optical fiber 216 designs may include, for example, but without limitation, SMF-28 ULL fiber, Ultra, Comet, SMF or other designs. The optical fiber 216 may be used in woven glass fabrics.

The draw furnace 214 may be oriented along a first pathway A such that an optical fiber 216 drawn from the optical preform 212 exits the furnace along the first pathway A. In the embodiments shown and described herein, the first pathway A is a substantially vertical pathway. A fiber take-up mechanism 240 comprising a plurality of fiber tensioning mechanisms 236 and a fiber storage spool 238 is used to apply and maintain the tension on the optical fiber 216 as it is drawn through the various stages of the system 200. The tension on the optical fiber 216 may directly adjust the diameter of the optical fiber 216. An optical fiber 216 may have a diameter of 70 microns to 150 microns, or 70 microns to 200 microns, or any value therebetween such as 70 microns, 80 microns, 90 microns, 100 microns, 110 microns, 120 microns, 130 microns, 140 microns, 150 microns, 160 microns, 170 microns, 180 microns, 190 microns, or 200 microns.

After the optical fiber 216 exits the draw furnace, the diameter of the optical fiber 216 may be measured by one or more non-contact sensors 218 positioned along the first pathway A. In some embodiments, the optical fiber 216 may then be directed through a first slow cooling device (SCD) 220 and/or a second slow cooling device 222. The system 200 may include a radiative heat source to slow cool the optical fiber 216 in slow cooling devices 220, 222. The slow cooling devices 220, 222 may include a wire-wound furnace configured to generate a temperature along a segment of the optical draw path that is greater than room temperature. For example, the slow cooling device 220, 222 may produce heat at or about 800° C., 900° C., 1,000° C., 1,100° C., 1,200° C., 1,300° C., 1,400° C., 1,500° C., 1,600° C., or any other temperature for slow cooling the optical fiber 216 per the designed temperature profile for drawing the optical fiber 216. Furthermore, the slow cooling device 220, 222 may cool the optical fiber to the first temperature at a rate of less than 5,000° C./s, or may cool the optical fiber from the second temperature to a third temperature at a rate less than 5,000° C./s.

The optical fiber 216 may then be redirected from the first pathway A to a second pathway A' by way of one or more non-contact pulleys 221A, 221B (generally referred to as non-contact pulleys 221). The non-contact pulleys 221 may utilize jets of air or fluid to redirect the optical fiber 216 being drawn from the optical preform 212. The non-contact pulleys 221 facilitate redirecting the fiber from the first pathway A to the second pathway A' without damaging the optical fiber 216 by preventing mechanical contact of the optical fiber with a solid surface. The non-contact pulleys 221 effect redirection by levitating the optical fiber 216 with the force provided by the jet of air or fluid. In addition to redirecting the optical fiber 216 from the first pathway A to the second pathway A', the non-contact pulleys 221 may also be used to facilitate the measurement of draw tension applied to the optical fiber 216 during the draw process.

It is understood that one or more non-contact pulleys 221A, 221B may be positioned between various manufacturing processes along the fiber draw path. The position of the one or more non-contact pulleys 221A, 221B may depend on the available manufacturing space, a state of the optical fiber 216 (e.g., a state where the bending or redirection of the optical fiber 216 will have little or no negative effect on the characteristics of the manufactured optical fiber 216), or based on other considerations known to those in the field of manufacturing optical fiber 216.

In some embodiments, once the optical fiber 216 is drawn through the slow cooling device 220, the non-contact pulleys 221A, 221B redirect the optical fiber 216 to the second pathway A' where the optical fiber 216 is subjected to additional manufacturing processes. For example, the next manufacturing process may include without limitation an RF plasma heating apparatus 224.

The RF plasma heating apparatus 224 generally includes an inductor coiled around a plasma containment vessel 304 (FIG. 3) where one or more gasses are introduced such that a plasma may be formed when an RF current is passed through the inductor 308. In some embodiments, a cyclonic structure of the plasma is formed to provide tangentially uniform heating along the length of the plasma plume. Heating rates of or exceeding 5,000° C./s, of or exceeding 10,000° C./s, or of or exceeding 15,000° C./s, or of or exceeding 20,000° C./s, or of or exceeding 25,000° C./s, or of or exceeding 30,000° C./s, or of or exceeding 35,000° C./s, or of or exceeding 40,000° C./s are achievable to rapidly heat the optical fiber 216 and reduce attenuation of the optical fiber 216.

Heating rate is determined by two at least two properties: (1) charged particle density in the plasma and (2) particle kinetic energy. Plasmas are weakly ionized (i.e., a small percentage of atoms are ionized compared to the whole quantity in a fixed volume at various pressures). Furthermore, ionization depends on the electrical source producing the plasma. For example, but without limitation, it is possible to have a higher percentage of ionization at a low pressure than at a high pressure. At low pressure, even though the density is less, the mean free path is greater (e.g., the mean free path is in the centimeter range) than at atmospheric pressure (e.g., where the mean free path is in the nanometer). The longer mean free path provides more opportunity for the charged particles to gain kinetic energy without frequent collisions. At atmospheric pressure, the frequency of collisions is much higher resulting in higher ionization rates, so the charged particle collision with the optical fiber is greater when the plasma production methods are the same in the low-pressure system as in the atmospheric pressure systems (i.e., RF power, frequency, EMF strength, flux density, and/or the like).

For example, through the methods, systems, and apparatuses shown and described herein, optical fiber 216 attenuation improvements may be greater than 0.001 dB/km, exceeding 0.002 dB/km, or even greater than 0.004 dB/km (e.g., at either 1310 nm or 1550 nm), when compared to an optical fiber 216 manufactured without implementing processes including RF plasma heating as described herein.

After passing the optical fiber through the RF plasma heating apparatus and, in some embodiments, the optical fiber 216 may then optionally be passed through a second slow cooling device 222 to allow for annealing of the optical fiber (i.e., reducing Tf and/or Rayleigh scattering) and/or healing of other fiber defects, for example. In some embodiments, the system 200 and methods described herein may alter the stress state of the produced optical fiber 216 (i.e., reducing stresses in the optical fiber by allowing time for the optical fiber 216 to anneal).

Thereafter, the optical fiber 216 may then be redirected from the second pathway A' to a third pathway A" by way of one or more non-contact pulleys 221C, 221D where the optical fiber 216 is subjected to additional manufacturing processes including, without limitation, the application of coatings (e.g., the optical fiber 216 is passed through coating die(s) 226), the curing of applied coatings (e.g., the optical fiber 216 is passed through irradiator(s) 228), and the like. The diameter of the optical fiber 216 may also be measured by non-contact sensors 218 positioned along pathway A" and the optical fiber 216 may be checked for flaws using a flaw detector 232. Additional processing steps (not shown) may also be performed on the optical fiber 216 along pathway A" prior to the optical fiber 216 being wound onto a fiber storage spool 238. It should be understood that pathway A" may be either parallel or nonparallel with the first pathway A. Further, it will be understood that the optical fiber 216 may be directed along any number of differently oriented intermediate pathways between the first pathway A and the third pathway A".

While FIG. 2, depicts a particular arrangement of manufacturing apparatuses for manufacturing an optical fiber 216, it is understood that one or more additional manufacturing apparatuses may be implemented in the system 200. Furthermore, the order of the manufacturing apparatuses, direction of the pathways and the number of the pathways may be different depending on the type of optical fiber 216 to be manufactured or the constraints of the facility in which the optical fiber 216 is manufactured.

Figure 3:
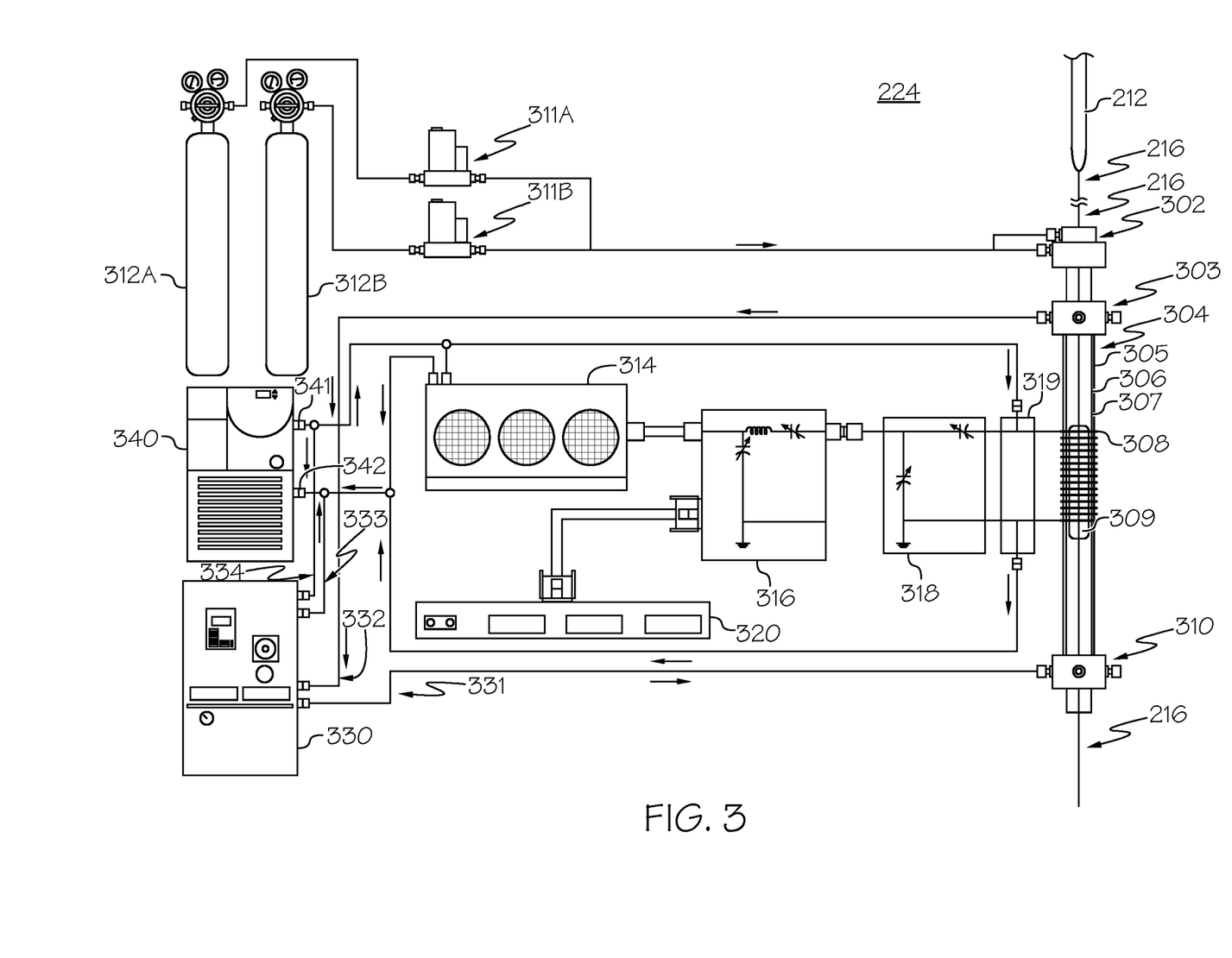
FIG. 3 is a schematic illustration of an RF plasma heating apparatus according to one or more embodiments shown and described herein.

Referring now to FIG. 3, a schematic illustration of an RF plasma heating apparatus (e.g., the RF plasma heating apparatus 224, FIG. 2) is depicted. The RF plasma heating apparatus 224 generally includes, an inductor 308 coupled to an RF generator 314 and one or more tuning-matching networks 316, 318 for generating plasma 309 with one or more gases configured to flow through a plasma containment tube 307 along with an optical fiber 216 drawn from an optical preform 212. The RF plasma heating apparatus 224 will now be described in more detail.

An optical fiber 216 is passed through the core of the containment vessel 304 encountering the plasma 309. The plasma 309 is produced by injecting one or more plasma working gases at a flow rate set by a mass flow controller (MFC) 311A, 311B fed by a high purity gas source such as a gas cylinder 312A, 312B containing a gas such as air, nitrogen, oxygen or a noble gas such as argon, helium or the like fed into inlet 302 which flows the gas mixture having one or more gases to the plasma containment tube 307. Two example mass flow controllers include Alicat's MC-10SLP-D and Alicat's MC0.5SCCM-D mass flow controllers. However, other makes, models, and types are contemplated and possible. In some embodiments, the gas purity and consistency needs to be maintained with less than 10% compositional changes, with less than 5% compositional changes, with less than 1% compositional changes, or even with less than 0.5% compositional changes. Maintaining gas purity and consistency as the gas is part of the electrical circuit in which energy is transferred from the inductor coils to the plasma. The energy transfer of the plasma depends on the impedance of the plasma, which in turn, is dependent on gas composition. To minimize energy transfer variations, the system is configured to maintain the plasma gas composition and flow so that it has a minimal change during heating. However, this may be difficult since the optical fiber has an air boundary layer, which can pull air or gases into the plasma containment tube. To address the gas purity and improve the consistency of the gas purity the RF plasma heating apparatus may implement, for example, but without limitation (1) air knives to strip the boundary layer away from the optical fiber, (2) a porous flow (i.e., a gas flow directed through a porous ceramic which creates a diffuse laminar flow that removes turbulences out of the gas stream delivered to the plasma) surrounding the optical fiber, or (3) a tiered system of two or more processes.

In some embodiments, the flow of the gas mixture into the plasma containment tube 307 may be introduced with controlled directional flow, for example, tangentially or at an acute angle (e.g., at an angle of 10 to 30 angular degrees) to produce a cyclonic flow of the plasma working gas in the containment vessel 304 which aids in forming a uniform heating plasma 309. The plasma generating gas flow rate may be about 4 SLPM to about 10 SLPM, for example, about 4 SLPM, about 5 SLPM, about 6 SLPM, about 7 SLPM, about 8 SLPM, about 9 SLPM, about 10 SLPM, or any value therebetween 4 SLPM and 10 SLPM. However, the gas flow rates are not limited to the rates listed herein. The gas flow rate may be determined to be a flow rate sufficient to generate plasma capable of reheating optical fiber at a heating rate of 5,000° C./s or greater.

In controlled directional flow embodiments, the gas flow when converted to plasma causes a twisting cyclone of plasma 309 the forms around and surrounds the optical fiber 216 passing through the plasma 309 ensuring uniform exposure to the heating capacity of the plasma 309. As the optical fiber 216 is drawn at higher velocities, oscillation and vibration of the optical fiber 216 may increase. However, the cyclonic plasma may ensure that the oscillations/vibrations do not adversely affect the heating of the optical fiber 216.

While embodiments of the RF plasma heating apparatus are described herein as including a controlled directional flow of gas, it should be understood that the gas mixture may be introduced into the apparatus without a controlled directional flow.

In some embodiments, the containment vessel 304 includes two concentric dielectric tubes which may formed from materials such as $SiO_2$, $Al_2O_3$, $Si_3N_4$, or similar. In one embodiment, the concentric dielectric tubes may be formed from, for example and without limitation, fused silica. The inner tube (also referred to herein as the "plasma containment tube 307") provides a containment volume for the plasma and permits the passage of the optical fiber 216 through the plasma 309. The outer tube 305 may be used to contain a coolant jacket. That is, a passage 306 is formed between the outer tube 305 and the plasma containment tube 307 where a coolant fluid may flow. The plasma containment tube 307 may have an inner diameter of about 1.0 cm, 1.5 cm, 2 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, or any value between 1.0 cm and 10.0 cm. The outer tube may have an outer diameter of about 1.0 cm, 1.5 cm, 2 cm, 2.5 cm, 3.0 cm, 3.5 cm, 4.0 cm, 4.5 cm, 5.0 cm, 5.5 cm, 6.0 cm, 6.5 cm, 7.0 cm, 7.5 cm, 8.0 cm, 8.5 cm, 9.0 cm, 9.5 cm, 10.0 cm, or any value between 1.0 cm and 10.0 cm. In some embodiments, the passage 306 may be 1.0 mm, 2.0 mm, 3.0 mm, 4.0 mm, 5.0 mm, 6.0 mm, 7.0 mm 8.0 mm, 9.0 mm 10.0 mm or any value between 1.0 mm and 10.0 mm wide (as defined from the inner surface of the outer tube 305 to the outer surface of the plasma containment tube 307). The plasma containment tube 307 may have a length of about 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, 30 cm, 31 cm, 32 cm, 33 cm, 34 cm, 35 cm, 36 cm, 37 cm, 38 cm, 40 cm, 41 cm, 42 cm, 43 cm, 44 cm, 45 cm, 46 cm, 47 cm, 48 cm, 49 cm, 50 cm, 51 cm, 52 cm, 53 cm, 54 cm, 55 cm, 56 cm, 57 cm, 58 cm, 59 cm, 60 cm, 61 cm, 62 cm, 63 cm, 64 cm, 65 cm, 66 cm, 67 cm, 68 cm, 69 cm, 70 cm, 71 cm, 72 cm, 73 cm, 74 cm, 75 cm, 76 cm, 77 cm, 78 cm, 79 cm, 80 cm, 81 cm, 82 cm, 83 cm, 84 cm, 85 cm, or any value between 10 cm and 85 cm.

In embodiments described herein, the coolant may be a high resistivity (e.g., having a resistivity of 18 megaOhm-cm or greater) fluid such as, for example and without limitation, deionized water provided by a heat exchanger unit 330. For example, a heat exchanger unit 330 may be a SMC HRW015-HS-Z Thermo DI Chiller, but other makes, models, and types are also contemplated and possible. Moreover, the heat exchanger unit 330 may include a deionizing filter ("DI filter") that is fluidly coupled to the coolant flow. The resistivity of the coolant may be 2 megaOhm-cm or greater, 3 megaOhm-cm or greater, 4 megaOhm-cm or greater, 5 megaOhm-cm or greater, 6 megaOhm-cm or greater, 7 megaOhm-cm or greater, 8 megaOhm-cm or greater, 9 megaOhm-cm or greater, 10 megaOhm-cm or greater, 11 megaOhm-cm or greater, 12 megaOhm-cm or greater, 13 megaOhm-cm or greater, 14 megaOhm-cm or greater, 15 megaOhm-cm or greater, 16 megaOhm-cm or greater, 17 megaOhm-cm or greater, 18 megaOhm-cm or greater, 19 megaOhm-cm or greater, or 20 megaOhm-cm or greater. In embodiments, other coolants may be used including lower resistivity water, Fluorinert® type coolants, or even gases such as air. For example, Fluorinert® has a resistivity at or about $5 \times 10^{15}$ Ohm-cm.

In some embodiments, the high resistivity coolant water flowing through the passage 306 of the containment vessel 304 is a closed loop coolant system. The closed loop coolant system allows the RF plasma heating apparatus 224 to maintain the purity of the coolant. That is, since the closed loop coolant system keeps the coolant isolated from other coolants used in the system or contaminants that may be otherwise introduced should the coolant was exposed to an impure environment. Maintaining the purity of the coolant is necessary to prevent the RF electromagnetic field that passes through the apparatus from coupling power with the coolant and thereby conducting RF current through the coolant (e.g., water) to grounded structures conveying the coolant to the plasma torch (i.e., the containment vessel 304 and the plasma 309). Allowing such coupling would result in a critical loss of power from the plasma production process.

In embodiments, the coolant water may be chilled by the heat exchanger unit 330, which is thermally and/or fluidly coupled to the chiller unit 340. The heat exchanger unit 330 is fluidly coupled to an inlet 310 and an outlet 303 which are fluidly coupled to opposing ends of the containment vessel 304 such that coolant may be delivered to, and flow through, the passage 306.

The plasma 309 is produced by an inductor 308, which has RF current flowing in it and is coiled around the containment vessel 304 (i.e., the outer tube 305, the passage 306, and the plasma containment tube 307) in a solenoid fashion on the outside of the outer tube 305.

In some embodiments, to prevent arcing from the inductor 308, the inductor 308 is formed from copper tubing positioned within a thermal epoxy body. The epoxy body has a high dielectric strength while still allowing thermal conductivity. The inductor 308 may be coiled around the containment vessel 304 in a number of turns. The number of turns may include from at least one turn to 20 turns with a spatial separation between turns of from 6 mm to 10 mm. Greater separation between the turns (i.e. greater than 10 mm) may cause uneven electromagnetic flux density on the inside of the inductor 308 where highly concentrated and uniform flux is important for uniform plasma 309 production throughout the volume space defined by the inductor 308 and the plasma containment tube 307. The design of the inductor 308, that is, the number of turns, the spatial separation between the turns, and the overall design (e.g., a single coil or dual-type coil as described in more detail with respect to FIGS. 5A and 5B), are selected to produce the highest efficiency of plasma production and to provide uniform heat transfer.

In some embodiments, the length of the plasma within the plasma containment tube 307, as measured along a pathway in the draw direction of the optical fiber, may be 1 cm, 2 cm, 3 cm, 4 cm, 5 cm, 6 cm, 8 cm, 9 cm, 10 cm, 11 cm, 12 cm, 13 cm, 14 cm, 15 cm, 16 cm, 17 cm, 18 cm, 19 cm, 20 cm, 21 cm, 22 cm, 23 cm, 24 cm, 25 cm, 26 cm, 27 cm, 28 cm, 29 cm, or 30 cm or any length between 1 cm and 30 cm. In some instances, the longer the plasma the more effective the heat transfer will be between the plasma and the optical fiber, particularly for optical fiber drawn at relatively high draw speeds.

By adjusting at least one of the three different parameters, the length of the plasma within the plasma containment tube may be shortened or lengthened. First, increasing the number of turns, extends the length of the plasma while decreasing the number of turns decreases the length of the plasma. Second, increasing the spatial separation between turns of the coil increases the length of the plasma while decreasing the spatial separation between the turns of the coil decreases the length of the plasma. Third, implementing a two-coil system, such as the one depicted and described with respect to FIG. 5B may be utilized to increase extend the length of the plasma.

To keep the resistance in the inductor 308 at a minimum and to minimize RF current losses resulting from the inductor resistance, which increases with heat, coolant water may be conveyed through the turns of the inductor 308. That is, coolant (e.g., water) may be passed through the copper tubing of the inductor 308. The chiller unit 340 may be fluidly coupled to the copper tubing from the inductor 308 by way of a fluid interface 319. For example, the chiller unit 340 may be a Glen Dimplex Thermal Solutions Koolan Koolers SVI-5000-M; however, other makes, models, and types are contemplated and possible. The fluid interface 319 may have a fluid inlet port and a fluid outlet port. In embodiments, the copper tubing may have a 6 mm OD and a 2.5 mm ID but variations on this size may be used to increase the coolant water flow and/or increase RF current handling capability. To further minimize inductor resistive losses, a silver coating having a thickness of at least 20 µm to 100 µm may be plated onto the copper tubing. While the inductor 308 has been described herein as being formed from copper tubing, it should be understood that the inductor 308 may be formed from a solid wire, such as a solid copper wire or the like, rather than copper tubing.

The inductor 308 receives RF current from an RF power generating circuit. The RF power generating circuit may include an RF generator 314, one or more tuning-matching networks 316, 318, and an electronic control unit 320. The RF generator 314 may be an MKS Spectrum 10 kW 13.56 MHz RF Generator model 1100, but other makes, models, and types are also contemplated and possible. The RF generator 314 produces an RF current having a frequency and power level. The frequency may be 0.5 MHz to 100 MHz, such as 0.5 MHz, 1.0 MHz, 1.8 MHz, 2.0 MHz, 2.17 MHz, 3.0 MHz, 4.0 MHz, and 5.0 MHz, 13.56 MHz, 27.1 MHz, 40 MHz, 100 MHz, or any value between 0.5 MHz and 100 MHz. The power level may be 0.5 kW to 5.0 kW, or 30 kW to 50 kW, or 0.5 kW to 20 kW, or 1.0 kW to 100 kW, or any value therebetween 0.5 kW and 100 kW. For example and without limitation, the RF generator 314 may be configured to output RF current with a frequency of 13.56 MHz at a power level up to 5.0 kW.

As the RF current frequency increases as the physical size of the inductor is increased, the inductive reactance increases. To provide maximum RF power transfer from the RF generator 314 to the inductor 308 the complex impedance of the RF generator 314 and the inductor 308 need to be matched. When they are matched the RF current and voltage are in phase resulting in maximum power transfer since P=E*I*cos(θ) where P is the power in Watts, E is the voltage in Volts, I is the current in Amperes, and theta (θ) is the phase angle between voltage and current in angular degrees. Since the cosine of 0 degrees is 1, any other phase angle results in a power that is less than maximum when both current and voltage are in phase and have a zero-phase angle between them.

By way of an example, the RF generator 314 may have a complex impedance of 50Ω+j0Ω. The inductor 308 used on the system shown in FIG. 3 may have a complex impedance of 12.5Ω+j174.2Ω (where Ω refers to "ohms"). To produce maximum power transfer, an intervening impedance matching device (referred to herein as the first tuning-matching network 316) is needed to transform the RF inductor complex impedance to the standard RF generator 50Ω impedance. In embodiments, a commercial impedance matching device (e.g., as a first tuning-matching network 316) such as an Advanced Energy Navigator 5 kW 13.56 MHz RF Impedance matching network, Model No. 3155168-002, or another make, model, and type may be implemented. Additionally, in some embodiments custom designed tuning-matching networks may be contemplated and possible.

In some embodiments, where a commercial impedance matching device such as the first tuning-matching network 316 is implemented the configurations available for matching impedances may be limited. Therefore, in some embodiments, a second tuning-matching network 318 may be required to cancel out a portion of the inductor's 308 inductive reactance resulting in a transformation of the inductance of the inductor 308 from a large value to a smaller value (e.g., from 2.1 µH to 1.0 µH, where H refers to "Henry," the SI unit for inductance). The implementation of one or more tuning matching networks 316, 318 will be described in more details with reference to FIG. 4.

Figure 4:
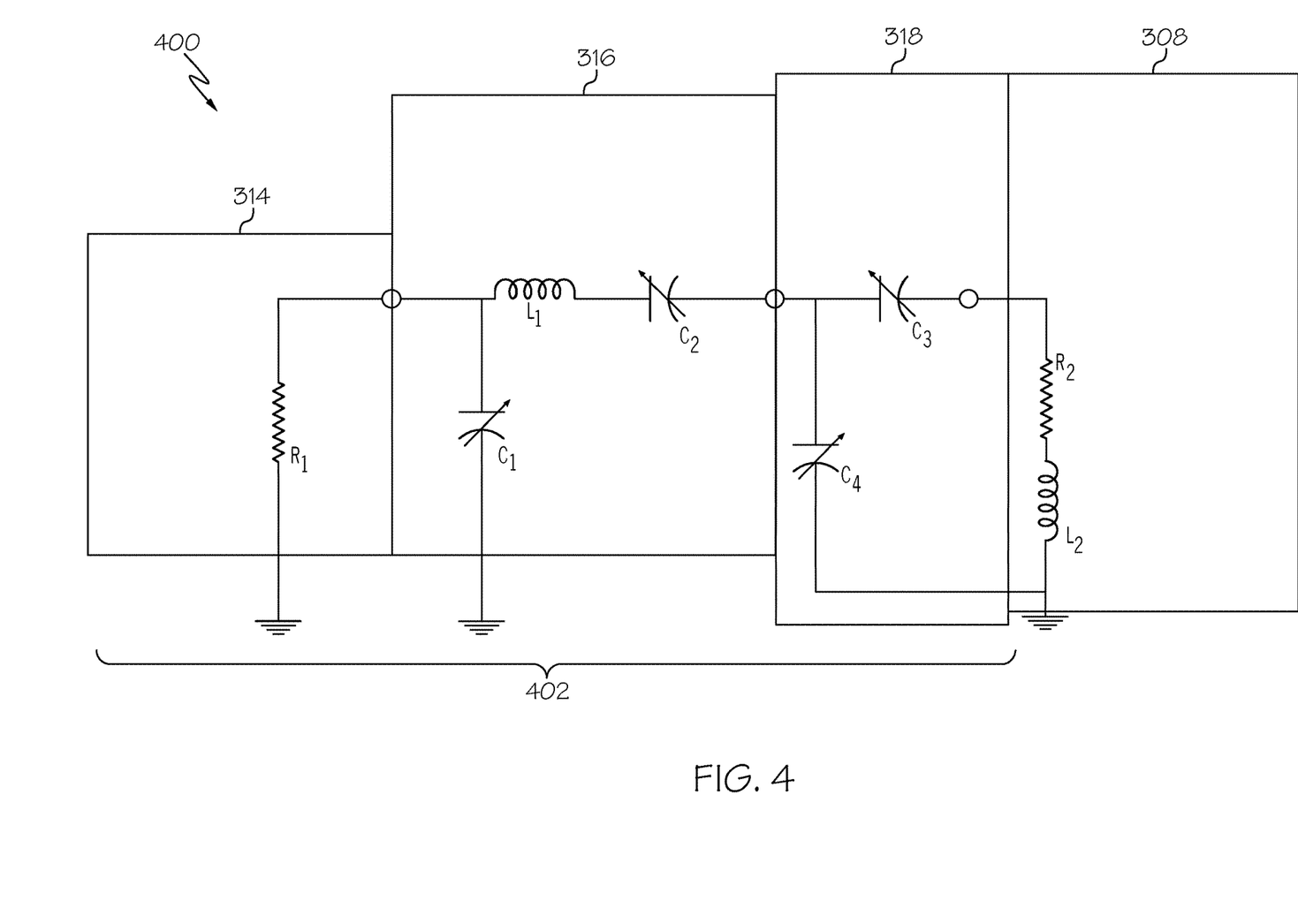
FIG. 4 is a schematic equivalent circuit illustration of an example RF plasma heating apparatus according to one or more embodiments shown and described herein.

Referring briefly to FIG. 4, an equivalent circuit illustration 400 of an example RF plasma heating apparatus is depicted. The RF generator 314 is symbolized by R1, the first tuning-matching network 316 is symbolized by an impedance matching network having an "L" topology which means it has a series variable capacitor C2 (e.g., 12 pF-500 pF, where F is the unit Faraday) and a shunt variable capacitor C1 (e.g., 10-1000 pF). To match the inductor 308 (L2) depicted in FIG. 3, the series capacitor C2 and the shunt capacitor C1 capacitance values need to be adjusted. However, for many commercially available impedance matching networks the series capacitor C2 needs to be set to a value that is not obtainable by the variable capacitor.

For example, to match the inductor 308, the series capacitance needed to be 770 pF and the shunt capacitance needed to be 407 pF. While the shunt capacitor C1 capacitance value was within the variable capacitance range, the series capacitor C2 capacitance value was not (i.e., 770 pF is greater than 500 pF). This situation is typical since when large inductors 308 are used as loads a much smaller capacitance value for the series capacitor in the matching network is required since capacitive reactance is indirectly proportional to inductive reactance and they must be equal for impedance matching to occur.

To compensate for the large inductor 308 a second tuning-matching network 318 having one or more additional variable capacitors C3, C4 is electrically coupled to the RF generator 314, the first tuning-matching network 316 and the inductor 308. The second tuning-matching network 318 may include a variable series capacitor C3 and/or a variable shunt capacitor C4. The variable capacitors C3, C4 are employed to reduce the size of the inductive reactance by adjusting the capacitance until the reactance cancels out a portion of the inductor's 308 inductive reactance resulting in a transformation of the inductance of the inductor 308 from a large value to a smaller value (e.g., from 2.1 µH to 1.0 µH). This transformation allows the large inductor 308 to be impedance matched through a first tuning-matching network 316 and a second tuning-matching network 318 having one or more additional capacitors in series and/or shunting the inductor 308 as described herein.

Referring again to FIG. 3, the circuit used to supply RF power to the inductor 308 for generating plasma 309 may further include an electronic control unit 320. Some commercially available impedance matching networks (e.g., the first tuning-matching network 316) include an electronic control unit 320, which controls the motors on the variable capacitors in at least the first tuning-matching network 316. The electronic control unit 320 may have two modes: manual and autotune. Manual allows an operator to change the capacitance values by jogging the motors while autotune monitors the voltage and current and their phase angles. In response, the autotune may adjust the capacitors to values that keep the phase angle between both near or at 0° (e.g., the phase angle may between 0°-5°).

Still referring to FIG. 3, to keep the RF generator 314, the one or more tuning-matching networks 316, 318, and the inductor 308 cool, coolant (e.g., water) is circulated through each of them with a chiller unit 340. The chiller unit 340 comprises an outlet 341 coupled to the inlets on the RF generator 314, the one or more tuning-matching networks 316, 318, and/or the inductor 308 so that coolant circulates through each of the devices. The outlets from each device are further fluidly coupled to the inlet 342 of the chiller unit 340 so that coolant may flow back to the chiller unit 340. The chiller unit 340 is also fluidly coupled to the closed loop heat exchanger unit 330. The chiller unit 340 supplies coolant to the inlet 333 of the heat exchanger unit 330 and the coolant returns back to the chiller unit 340 from outlet 334 of the heat exchanger unit 330. As briefly described above, the closed loop coolant (e.g., high resistivity deionized coolant water) flows out of the heat exchanger unit 330 from its outlet 331 into the bottom of the passage 306 of the containment vessel 304 through an inlet 310. The coolant flows over and around the inner plasma containment tube 307 and out the outlet 303 returning to the inlet 332 of the heat exchanger unit 330. This coolant (e.g., the deionized water) is isolated from the coolant provided to the RF generator 314, the one or more tuning-matching networks 316, 318, and the inductor 308.

The following description includes some additional features, observations, and results of experiments conducted to validate the functionality of the RF plasma heating apparatus as well as to determine to the configuration of the RF plasma heating apparatus for operation in manufacturing an optical fiber drawn from an optical preform.

Figure 5A:
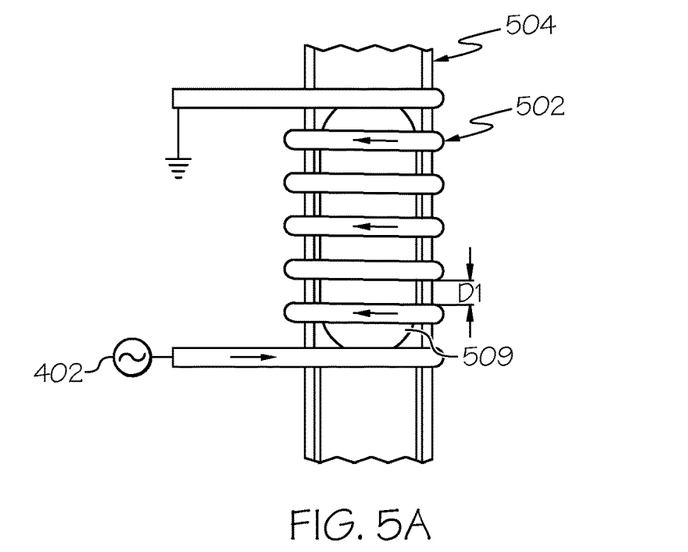
FIG. 5A is a schematic illustration of an example plasma generating inductor according to one or more embodiments shown and described herein.
Figure 5B:
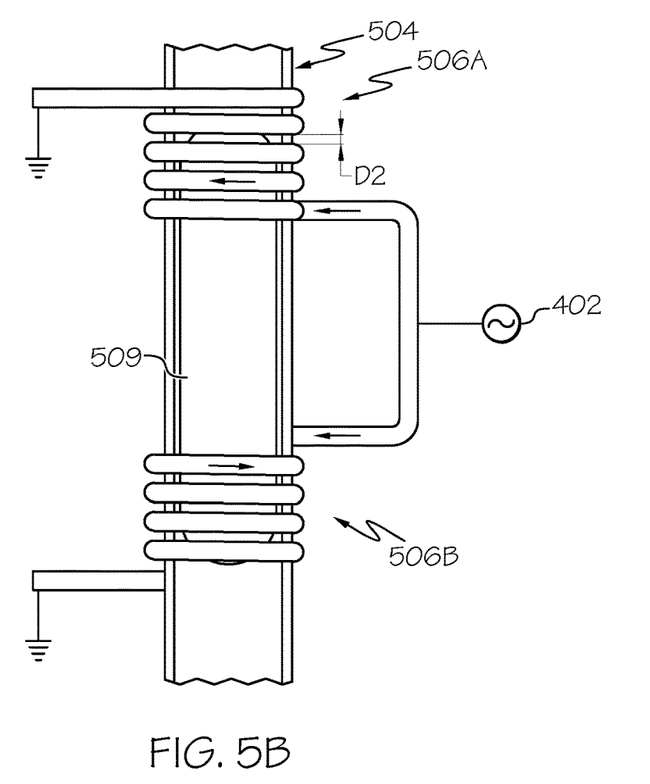
FIG. 5B is a schematic illustration of an example dual oppositely phased inductor for generating plasma axially for heating a fiber along a length according to one or more embodiments shown and described herein.

Referring now to FIGS. 5A and 5B, schematic illustrations of example plasma generating inductors are depicted. FIG. 5A depicts a single coil inductor 502 coiled around a containment vessel 504 for generating plasma 509 therein. In some embodiments, the inductor (e.g., inductor 308, FIG. 3) is a single coil inductor 502 having at least one turn and up to 20 turns. Each of the turns of the single coil inductor 502 are spatially separated by a distance D1. In other embodiments, a dual-type inductor coil 506 may be coiled around the containment vessel 504 as depicted in FIG. 5B. However, unlike the single coil inductor 502, a dual-type inductor includes a first coil 506A coiled in a first direction around a first portion of the containment vessel 504 and a second coil 506B coiled in a second direction (opposite the first direction) around a second portion of the containment vessel 504. Both the first coil 506A and the second coil 506B may be coupled to the same RF generating source 402 such that RF current flows through both coils and generates a plasma 509 between the coils 506A, 506B within the containment vessel 504. Similar to the single coil inductor 502 each of the first coil 506A and the second coil 506B includes a number of turns and each turn of the coils are spatially separated by a distance D2.

Figure 6:
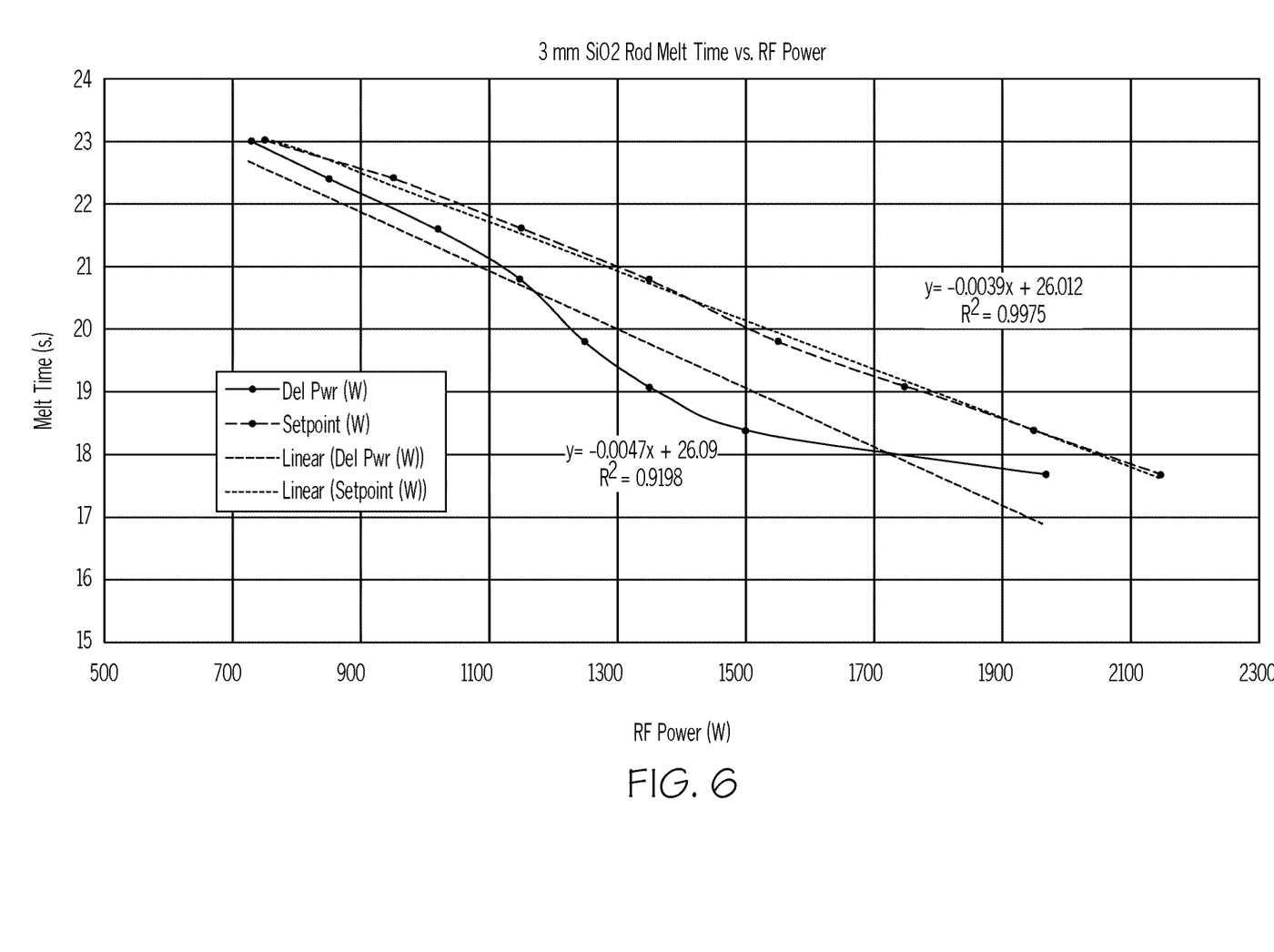
FIG. 6 is a chart illustrating experimental data of applied RF power versus melt time for plasma melting fused silica rods according to one or more embodiments shown and described herein.

Referring now to FIG. 6, a chart illustrating experimental data of applied RF power versus melt time for plasma melting fused silica rods is depicted. The chart depicts melt times for a 3 mm diameter optical fiber rod as a function of RF power (W) at a frequency of 13.56 MHz. The delivered power (Del Pwr) is the actual measured power used to generate the plasma, which is also known as forward power, and the set point power (Setpoint) is the power level set on the RF generator. As the power increases, the melt time decreases.

Figure 7A:
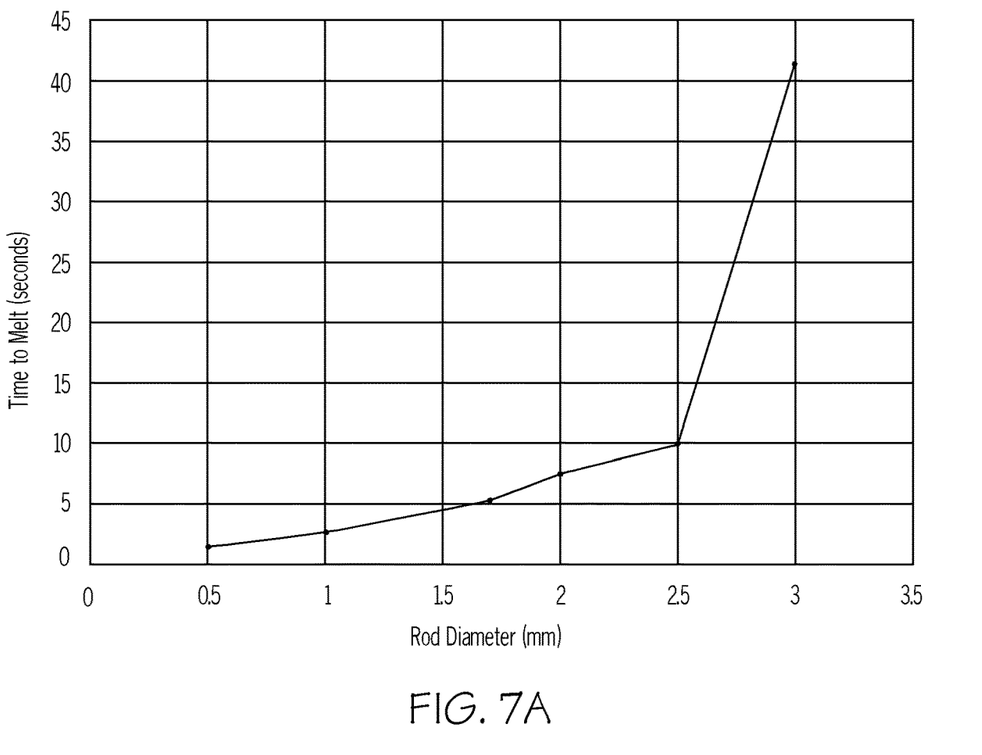
FIG. 7A is a chart illustrating the relationship between fiber optical rod diameter to melt time according to one or more embodiments shown and described herein.
Figure 7B:
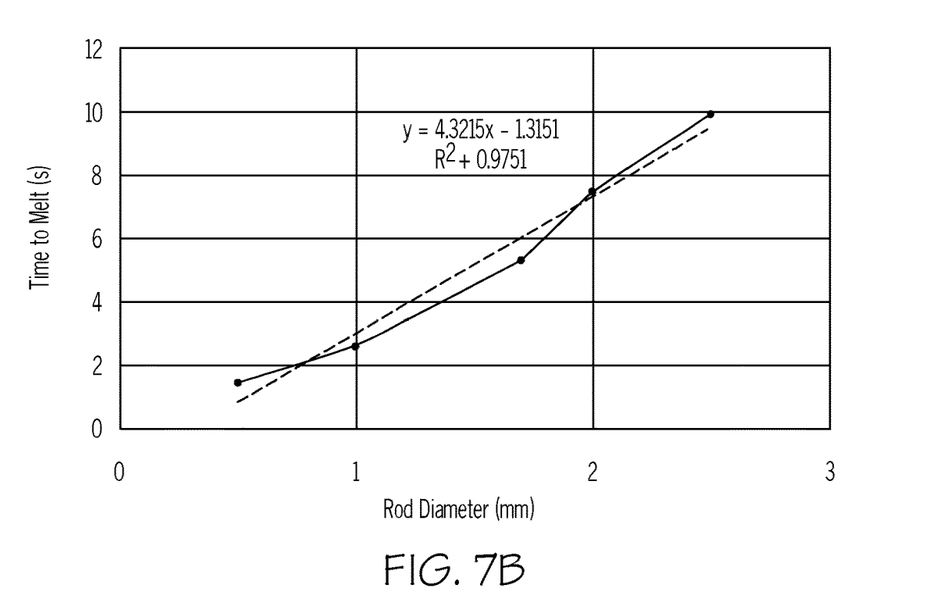
FIG. 7B is a chart illustrating a portion of the chart illustrated in FIG. 7A in more detail according to one or more embodiments shown and described herein.

FIGS. 7A and 7B illustrate a chart showing the relationship between a fiber optic rod of various diameters and the corresponding melt time when subjected to plasma generated by an inductor having an RF current with a power level setting of 950 W and operating at 13.56 MHz. The plasma gas mixture consisted of an $N_2$ buffer gas at 0.5 SLPM and argon (Ar) plasma gas at 6.8 SLPM and secondary mix of $N_2$ at 2.5 ccm. As the diameter of the fiber optic rod increased the melt time increased. Moreover, as observed in FIG. 7B, which is a detailed expanded view of the chart in FIG. 7A, a linear fit is obtainable for rods having a diameter between 0.5 and 2.5 mm.

By way of further example, several experiments were performed showing the time to melt for quartz rods having different diameters and subject to plasma generated at different power levels. Table 1 below depicts the results of the experiments.

TABLE 1

| Experiment | Power [W] | Ar [slpm] | N2 Premix [slpm] | N2 Buffer [slpm] | Time to Melt [s] | Diameter [mm] |
| --- | --- | --- | --- | --- | --- | --- |
| 1 | 1600 | 5 | 0 | 2 | 6.7 | 3 |
| 2 | 2000 | 5 | 0 | 2 | 10.6 | 3 |
| 3 | 2500 | 6 | 1 | 1 | 5.5 | 3 |
| 4 | 2000 | 5.4 | 0.015 | 1 | 6.6 | 3 |
| 5 | 2000 | 5.4 | 0.015 | 1 | 1.4 | 1 |

The test data in the table above shows the time between insertion of the quartz rods into the plasma until melting and separation of the quartz rods occurred. Experiments 1 and 2 utilized a $N_2$ buffer tube inserted in the lower end of the containment vessel to provide a plasma quenching boundary mechanism preventing filamentation of the plasma and exhausting of the plasma discharge, thereby maximizing plasma heat transfer to the quartz rods. It was discovered that by premixing $N_2$ into the plasma gas introduced tangentially at the top of the containment vessel 304 (FIG. 3), a stable concentrated plasma resulted. It was also discovered that pure Ar was needed on startup to sustain the plasma and bring it up to temperature at which point the $N_2$ premix was added at the inlet (302, FIG. 3). Furthermore, the $N_2$ buffer quench tube could be used to keep the plasma from filamentation during the startup phase.

Experiment 3 incorporated the $N_2$ premix and the $N_2$ buffer tube. The $N_2$ premix had a 1:6 ratio with the Ar. This mixture resulted in a cooler, $N_2$-dominated plasma and required higher power (2.5 kW) to produce similar melting times as experiments 1 and 2.

Experiments 4 and 5 reduced the $N_2$ premix to 15 ccm, which resulted in a highly stabilized plasma while providing high heat transfer to the quartz rods. In experiment 4, the power was applied at 2 kW with Ar at 5.4 SLPM and a 15 ccm $N_2$ premix that achieved heating of the 3 mm diameter quartz rod to >1,800° C. in 6.6 seconds.

Experiment 5 utilized the same parameters as Experiment 4 on a 1 mm diameter quartz rod. The 1 mm diameter rod was heated to greater than 1,800° C. in 1.4 seconds. These experiments indicate a linear relationship between the diameter of the rod and melting time. Based on this relationship, the melting time for a 125-µm fiber, which is ⅛ the diameter of the 1 mm quartz rod, would be 22 ms. Moreover, given that even more heat can be transferred to the optical fiber through process and equipment optimization and an increased RF power input with adjustments to the frequency, the data supports a conclusion that heating a moving fiber (e.g., moving at a draw speed of at least 50 m/s) to about 1,100° C. to about 1,200° C. is feasible.

The systems, methods, and apparatuses described herein provide for manufacturing of an optical fiber drawn from an optical preform. Some embodiments include an RF plasma heating apparatus configured to rapidly heat an optical fiber that is drawn from an optical preform to improve and reduce attenuation and/or other optical defects. This is possible by utilizing an RF plasma heating apparatus that generates a thermal plasma for annealing (e.g., reheating an optical fiber to extend the time of annealing to improve fiber optic characteristics). The present disclosure describes systems and methods of utilizing an RF plasma heating apparatus for heating optical fibers that are drawn at draw speeds from 2.5 m/s to 120 m/s, at heating rates of or exceeding 5,000° C./s.

It should now be understood that the methods and systems described herein provide for manufacturing an optical fiber utilizing an RF plasma heating apparatus. It should also be understood that the methods and techniques described herein may be used in conjunction with any process or operation for manufacturing an optical fiber. Further, while specific reference has been made to the use of the methods and apparatus described herein for manufacturing glass optical fibers utilizing an RF plasma heating apparatus, it should be understood that the methods and apparatus described herein may also be for the manufacture of any type of fiber including, without limitation, carbon fibers, synthetic fibers, natural fibers, and the like.

It will be apparent to those skilled in the art that various modifications and variations may be made to the present invention without departing from the spirit and scope of the invention. Thus it is intended that the present invention cover the modifications and variations of this invention provided they come within the scope of the appended claims and their equivalents.

What is claimed is:

1. A method of manufacturing an optical fiber, the method comprising:
    heating an optical preform in a draw furnace;
    drawing an optical fiber from the optical preform; and
    annealing the optical fiber by passing the optical fiber through an RF inductively coupled plasma heating apparatus configured to form a cyclonic structure of plasma that tangentially heats a length of the optical fiber at a heating rate of 5,000° C. per second (° C./s) or greater as the optical fiber passes through the plasma and a cooling device configured to cool the optical fiber, the RF inductively coupled plasma heating apparatus comprises an inductor having one or more coils wrapped around a length of a plasma containment tube for containing the cyclonic structure of plasma and permitting the passage of the optical fiber through the cyclonic structure of plasma.

2. The method of claim 1, wherein the RF inductively coupled plasma heating apparatus operates at a frequency of 1 MHz to 100 MHz.

3. The method of claim 1, wherein the RF inductively coupled plasma heating apparatus operates at a power level of 1 kW to 100 kW.

4. The method of claim 1, wherein the optical fiber is drawn at a draw speed of 30 m/s or greater.

5. The method of claim 1, further comprising a process step selected from the group consisting of:
    passing the optical fiber through one or more coating and curing processes;
    inspecting the optical fiber for flaws; and
    spooling the optical fiber on a spool.

6. A method of processing an optical fiber comprising:
    conveying an optical fiber at a speed greater than 30 m/s, the conveying comprising heating the optical fiber from a first temperature to a second temperature, the heating comprising exposing the optical fiber to a plasma generated by an RF inductively coupled plasma heating apparatus configured to form a cyclonic structure of plasma that tangentially heats a length of the optical fiber at a heating rate of 5,000° C. per second (° C./s) or greater as the optical fiber passes through the plasma, the RF inductively coupled plasma heating apparatus comprises an inductor having one or more coils wrapped around a length of a plasma containment tube for containing the cyclonic structure of plasma and permitting the passage of the optical fiber through the cyclonic structure of plasma.

7. The method of claim 6, wherein the optical fiber has a diameter between 70 microns and 150 microns.

8. The method of claim 6, wherein the first temperature is less than 800° C. and the second temperature is greater than 800° C.

9. The method of claim 6, wherein the first temperature is between 100° C. and 1,000° C. and the second temperature is between 800° C. and 1,400° C.

10. The method of claim 6, wherein the plasma surrounds the optical fiber.

11. The method of claim 6, wherein the conveying comprises directing the optical fiber along a process pathway and wherein the heating from the first temperature to the second temperature occurs over a distance of less than 100 cm along the process pathway.

12. The method of claim 11, wherein the second temperature is at least 100° C. greater than the first temperature.

13. The method of claim 6, further comprising cooling the optical fiber from the second temperature to a third temperature at a rate less than 2,000° C./s.

* * * * *

UNITED STATES PATENT AND TRADEMARK OFFICE
CERTIFICATE OF CORRECTION

PATENT NO. : 11,753,327 B2
APPLICATION NO. : 16/903781
DATED : September 12, 2023
INVENTOR(S) : Daniel Robert Boughton et al.

It is certified that error appears in the above-identified patent and that said Letters Patent is hereby corrected as shown below:

On the Title Page

On the page 2, in Column 2, item (56) under "Other Publications", Line 20, delete "Chapters," and insert -- Chapter 8, --.

Signed and Sealed this
Nineteenth Day of March, 2024

Katherine Kelly Vidal
*Director of the United States Patent and Trademark Office*